P. MIHAN.
Apparatus for Carbureting Air.
No. 57,543.
2 Sheets—Sheet 1.
Patented Aug. 28, 1866.
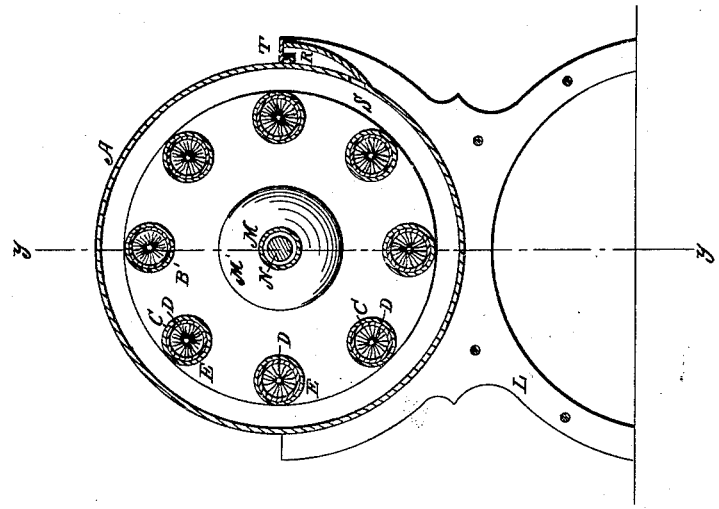
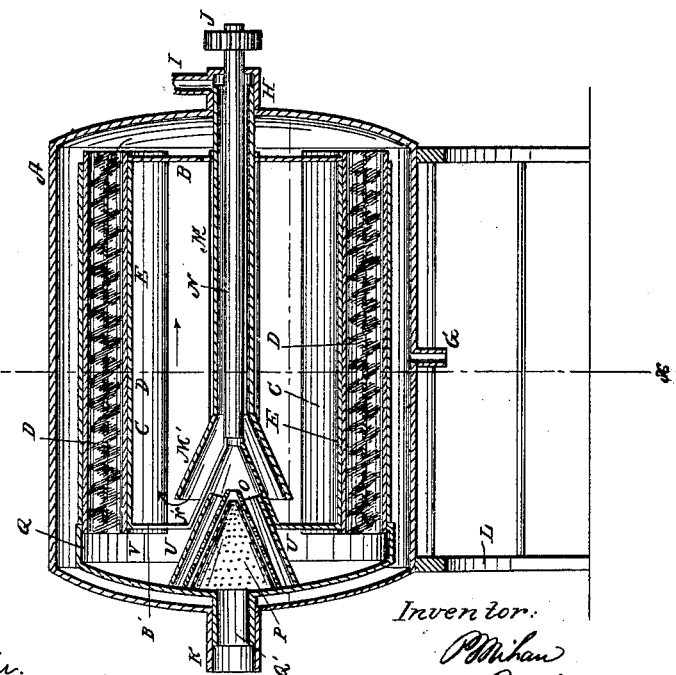
Witnesses:
Inventor:

P. MIHAN.
Apparatus for Carbureting Air.
No. 57,543.
2 Sheets—Sheet 2.
Patented Aug. 28, 1866.
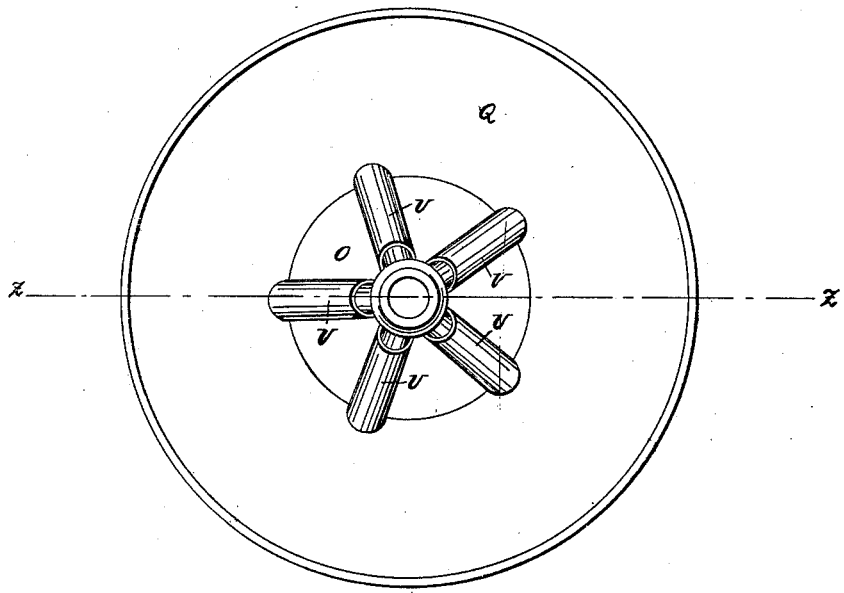
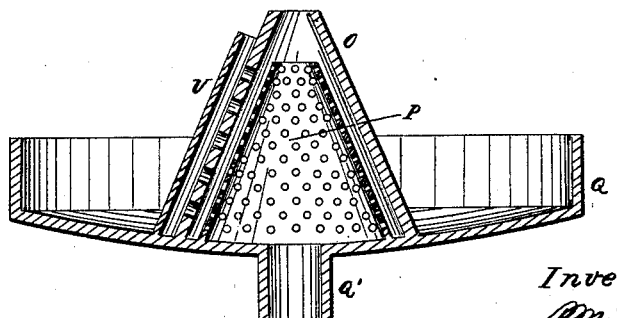

UNITED STATES PATENT OFFICE.

PATRICK MIHAN, OF BOSTON, MASSACHUSETTS.

IMPROVED APPARATUS FOR CARBURETING AIR.

Specification forming part of Letters Patent No. 57,543, dated August 28, 1866.

*To all whom it may concern:*

Be it known that I, PATRICK MIHAN, of Boston, in the county of Suffolk and State of Massachusetts, have invented a new and useful Improvement in Apparatus for Carbureting Air; and I do hereby declare that the following is a full, clear, and exact description thereof, which will enable others skilled in the art to make and use the same, reference being had to the accompanying drawings, forming part of this specification, in which—

Figure 1 is a vertical axial section of an apparatus made according to my invention, taken on the line $y$ of Fig. 2. Fig. 2 is a cross-section on the line $x$ of Fig. 1. Fig. 3 is a detailed view of the inner face of the head of the inner cylinder or generator, B, enlarged. Fig. 4 is a section thereof, enlarged, on the line $z$ of Fig. 3.

The object of this invention is to carburet air so as to produce an inflammable gas; and it consists in certain novel devices whereby the desired result is obtained in an expeditious and economical manner.

The generator consists of one or more hollow cylinders or tubes of tin or other suitable metal, in each of which is placed a cylindrical brush, or an equivalent device, through which air is free to pass. These hollow cylinders are placed in circular order by fixing or supporting them on disks near their ends. When the disks are rotated the cylinders or tubes become immersed in liquid hydrocarbon contained in a vessel or chamber within which the tubes, are placed. The tubes are placed horizontally, and the air is compelled to pass through the whole extent of the wet brushes contained in them.

A designates a hollow cylindrical vessel, which is supported on a suitable frame, L. From the center of its ends project pipes H and K, the latter being the outlet-pipe of the apparatus, and which, when the apparatus is in operation, is connected with a suitable conducting-pipe, to lead the gas or carbureted air to a reservoir or to a burner or burners. The pipe H is closed at its end, but has a lateral branch, I, through which the air to be charged is passed into the apparatus.

B B' are disks which support a series of tubes, C, that are open at both ends. Each tube C has a filling, D, of bristles or an equivalent open or porous material. The bristles are in this example made up in the form of a brush, and the bristles may be arranged spirally or in any other manner, so as to be in open order or well distributed throughout the tubes. The disk B is smaller in diameter than the disk B', so that, while the tubes C at one end pass entirely through the disk B' their opposite ends, although concentrically arranged, rest in semicircular seats cut out of the edge of said disk B. The tubes are secured by soldering them to the disks.

From the inner side of disk B proceeds a hollow cone, N', the apex of which terminates in a solid shaft, N, that extends through the pipe H of the receiver or vessel A, and carries on its outer end a wheel or pulley, J, by means of which motion is imparted to the disks B' B and to the series of tubes which are connected to them. The shaft N is surrounded by a sleeve or tube, M, which goes through a central opening made for it in the disk B, and which is fixed within the pipe H so as not to obstruct the mouth of the branch I. The left end of this sleeve or tube terminates in a conical shell, M', which partly surrounds the cone N', but does not extend as far as the disk B'. An annular space is left between the inner sides of the tube M and its conical shell and the outside or circumference of the shaft N and the cone N', through which space the air that enters the branch pipe I passes into the space between the disks.

The tubes C are surrounded by a covering of felt, cloth, or any suitable absorbing material, which coverings become saturated with the hydrocarbon liquid which is supplied to the vessel A, and so carry up with them a quantity thereof, in the revolution of the tubes, into the upper or higher parts of the chamber, where air-currents are continually passing.

In this example of my invention I have shown the tubes in a horizontal position; but they may be placed in a vertical or inclined position, in which case the liquid should be made to pass downward through the tubes, while the air to be charged passes upward through them.

The disk B' and the ends of the tubes passing through it are inclosed and shut off from the left-hand end of the chamber A by a cover, Q, from whose center proceeds toward the left a pipe, Q', that fits tightly in the outlet-pipe K of chamber A. The inner end of pipe Q' opens in a hollow cone, P, with perforated sides, the base of which hollow cone joins the inner face of cover Q and incloses the entrance to pipe Q'. The perforated cone P is itself surrounded by a cone, O, on whose sides are arranged longitudinally tubes U, five or more or less in number, semi-cylindrical in form, whose ends near the apex of the cone are open, and which tubes communicate with the interior of the cone O by means of perforations through those parts of it which are covered by said tubes, so that any vapor or gas which enters the ends of the tubes can pass into the cone O through such perforations. The apex of the cone O and the end of the tubes U are within the conical part N' of the disk B'.

The red horizontal line in Fig. 1 is meant to indicate a proper height for the naphthaline, benzine, or other volatile hydrocarbon to be used in the apparatus.

In operating the apparatus hydrocarbon liquid is supplied to the receiver or chamber A through a side pipe, R, which opens into said chamber at S, and which can be closed by a cap, T.

The residuum, as well as the whole charge, can be at any time drawn away through a discharge-pipe, G, in the bottom of the chamber.

The tube M M' is fixed so as to be stationary.

Motion being given to the wheel J, the shaft N will be revolved, and so rotary motion will be given to the disks B B' and the tubes attached to them. The tubes being successively immersed in the hydrocarbon, the mass of bristles within them will be moistened therewith, and when the tubes rise out of the bath the air-currents supplied to the apparatus through the induction-pipe I, and the course of which is indicated by the arrow, enter the open ends of said tubes on the right-hand side and pass entirely through the mass of bristles, issuing thence in a carbureted state into the space V, inclosed by cover Q, whence it passes between and around the tubes U into the cone N, and thence into the mouths of said tubes U through the line of perforations in the sides of cone O, then through the perforated cone P into the outlet Q'.

The hydrocarbon which is taken up by the bristles in the tubes C is very finely divided by said bristles, so that the air, which rushes through in divided streams, will come in actual contact with a greater quantity of hydrocarbon than if the latter were exposed in an unbroken mass.

The tubes C may be supplied with any other filling which shall be porous or of such a character as to divide the air into fine currents and expose to it a large surface wet with hydrocarbon. The porous covering of the tubes C will also expose a large surface wet or moist with the liquid to the air, which enters the apparatus before such air enters the ends of tubes C.

It will be observed that the liquid in chamber A cannot enter the outlet-pipe through cone O, because said cone is wholly protected from contact with such liquid by the disk B and its cone-shaped center part, N', on the one side, and by the cover Q on the other side, and whatever liquid is carried upward by the rotation of the tubes will run down again freely by reason of the inclination of the conical parts N' and M'.

I claim as new and desire to secure by Letters Patent—

1. In apparatus for carbureting air, conducting the air to be treated through an inlet-tube, M, placed about the shaft of the apparatus, and terminating near the remote end of the apparatus in a cone-shaped mouth, M', so as to increase the distance to be traversed by the air after it is delivered within the generator, substantially as shown.

2. In apparatus for carbureting air, the use of open tubes supplied with bristles or their equivalent, revolving through or in a bath of hydrocarbon, and exposed, on emerging therefrom, to currents of air, substantially as shown.

3. The cover Q, with its outlet-pipe Q', its cones P and O, and tubes U, constructed and arranged substantially as shown and described.

4. Forming a space, V, for receiving the carbureted air, in combination with the tubes C and the cone O and tubes U, substantially as shown.

5. Covering the tubes C with an absorbing material, for the purpose of exposing to the fresh air a surface or surfaces wet with hydrocarbon while such air is on its way to the end of said tubes, substantially as shown.

PATRICK MIHAN.

Witnesses:
T. L. WAKEFIELD,
C. B. SHACKFORD.